(12) United States Patent
Unseld et al.

(10) Patent No.: US 6,429,845 B1
(45) Date of Patent: *Aug. 6, 2002

(54) PROCESS FOR DISPLAYING SEVERAL SETS OF INFORMATION

(75) Inventors: Eckard Unseld, Neustetten; Ralf Milkner, Weil der Stadt, both of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 199 days.

(21) Appl. No.: 08/913,029

(22) PCT Filed: Feb. 9, 1996

(86) PCT No.: PCT/DE96/00200

§ 371 (c)(1),
(2), (4) Date: Sep. 5, 1997

(87) PCT Pub. No.: WO96/27510

PCT Pub. Date: Sep. 12, 1996

(30) Foreign Application Priority Data

Mar. 7, 1995 (DE) .......................... 195 07 997

(51) Int. Cl.⁷ .............................. G06F 3/00; G06F 13/00
(52) U.S. Cl. .................... 345/117; 345/342; 340/461
(58) Field of Search ..................... 340/52, 439, 461, 340/521, 522, 525; 345/117, 333, 342

(56) References Cited

U.S. PATENT DOCUMENTS

| | | | | |
|---|---|---|---|---|
| 4,442,424 A | * | 4/1984 | Shirasaki et al. | 340/52 |
| 4,447,801 A | * | 5/1984 | Masuda | 340/52 |
| 4,588,987 A | * | 5/1986 | Stephens | 340/525 |
| 4,594,572 A | * | 6/1986 | Haubner et al. | 340/52 |
| 5,241,295 A | * | 8/1993 | Madau | 340/461 |
| 5,642,093 A | * | 6/1997 | Kinoshita et al. | 340/439 |
| 5,880,710 A | * | 3/1999 | Jaberi et al. | 345/117 |

FOREIGN PATENT DOCUMENTS

| | | |
|---|---|---|
| DE | 27 36 465 | 2/1979 |
| DE | 28 21 344 | 11/1979 |
| DE | 33 46 370 | 7/1985 |
| EP | 0 122 043 | 10/1984 |

OTHER PUBLICATIONS

German periodical Lastauto Omnibus, Nov. 1992, pp. 46, 48 and 50.

* cited by examiner

*Primary Examiner*—Steven Saras
*Assistant Examiner*—Srilakshmi K. Kumar
(74) *Attorney, Agent, or Firm*—Kenyon & Kenyon

(57) ABSTRACT

A process for displaying several sets of information with different display priority on a display panel, in which a symbol is displayed on the display panel for information with high display priority, starting from the time of occurrence of a specific condition, and changed by an operator, as a function of the activation of a means of input.

18 Claims, 2 Drawing Sheets

PROCESS FOR DISPLAYING SEVERAL SETS OF INFORMATION

FIELD OF THE INVENTION

The present invention relates to a process for displaying several sets of information.

BACKGROUND INFORMATION

Display instruments which have electronic displays, for example in the form of LCD displays, are already known from the motor vehicle sector These displays can be used universally and serve to display information about vehicle-specific data for the vehicle driver. Furthermore, it is known that when a relevant error occurs in the vehicle status, the vehicle driver can be given information to this effect on the display instrument. For example, displays are known in which a warning light lights up on the display field if the gas level in the tank drops below a predetermined limit. The warning light does not go off until the tank has been filled above the predetermined limit.

SUMMARY OF THE INVENTION

A process according to the present invention for displaying several sets of information is advantageous in that information which is displayed on the display panel can be modified as a function of activating at least one means of input, so that while the displayed information continues to be displayed, it is displayed in a form that can be chosen by the operator. Activation of the means of input can also serve as confirmation, for example to a memory, that the operator has received and read the information in question.

If the symbol is displayed until the specific condition has been eliminated, the operator is constantly reminded that the specific condition should be noted.

A change in the symbol size and/or symbol form is advantageous in that a variable display of the sets of information is possible.

By adding alphanumeric characters to the symbol, it is further possible to give the operator information in text form, allowing immediate recognition of the related informational content.

It is also advantageous if the symbol is initially displayed with a large symbol size and/or with a condition description in the form of alphanumeric characters, and if this symbol is reduced in size and/or adapted to the condition only after the operator has thus selected (since the first display of the symbol draws the full attention of the operator and makes clear and good recognition of the information), followed by a reduced representation of the symbol after activation of the means of input, since the operator then has already taken cognizance of the content of the information. Furthermore, the display panel becomes available again for display of other information with lower display priority, after important information, i.e. information with high display priority, has been displayed.

If the symbol is replaced with at least one other symbol which represents the number of existing sets of information with high display priority, several sets of information with high display priority can be converted to the other symbol after having been displayed for the first time, with the operator receiving information about the number of sets of information relating to specific conditions that are being displayed.

If the symbol is displayed again in unchanged form after an activation of the at least one means of input, it is possible for the operator, in simple manner, to recall the information to the screen in its detailed form of representation.

The change in the forms of representation of the other sets of information with lower display priority is an advantageous measure since it is thus possible to display other sets of information, simultaneously with the information having a high display priority. In particular, it is possible to display the sets of information with lower display priority in a smaller size, if the symbol size for the symbol for the information with high display priority is large, and, vice versa, to display the sets of information with lower display priority in a larger size, once the symbol for the information with high display priority was reduced in size.

If a selection menu is provided, the operator is given the choice of how to change the symbol. This results in the advantage of flexibility of the display process.

If the displays of the other sets of information with lower display priority are changed, e.g. reduced in size or at least temporarily not displayed, if a certain condition occurs, then the symbol for the display of sets of information with high display priority can be modified to be particularly, large and therefore particularly noticeable and informative, thus making the display process more user-friendly.

DETAILED DESCRIPTION OF THE INVENTION

Figure 1A:
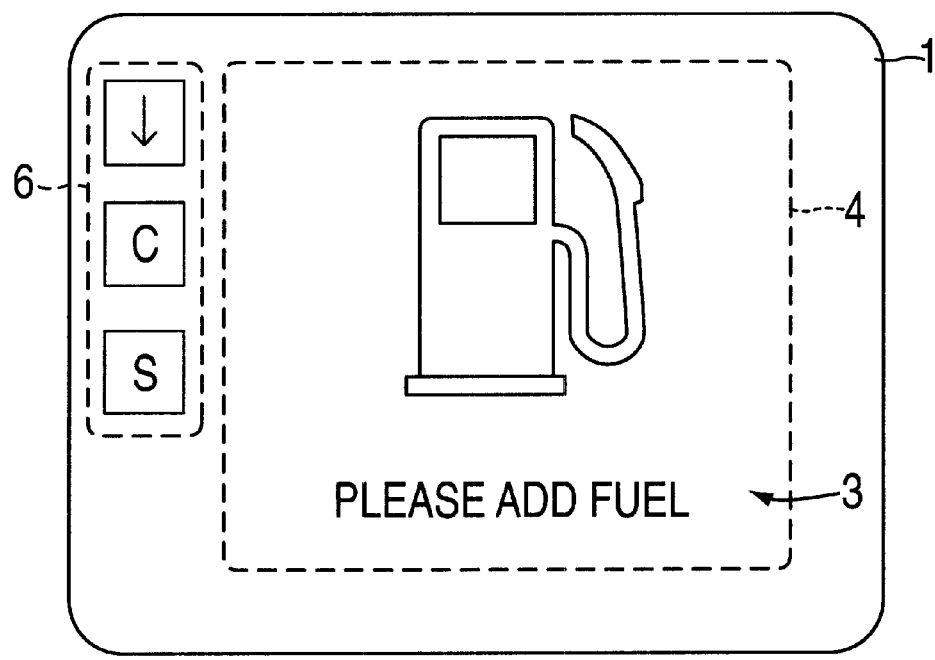
FIG. 1a shows a display panel with a selection menu and a symbol.

In FIG. 1a, a display panel 1 is shown, on which a symbol 4 and a selection menu 6 are displayed. Symbol 4 has a relatively large symbol size and consists of a pictorial representation of a gas pump as well as corresponding alphabetical characters. The alphabetical characters, together with the pictorial representation, provide information with high display priority 3. Selection menu 6 includes three individual fields, in which a field ↓ is provided to reduce the size of symbol 4, another field c for converting symbol 4 into a counter, and a third field s for reducing symbol 4 exclusively to the pictorial representation of the gas pump, each of which can be selected.

Using means of input (e.g., an input system), not shown FIG. 1a, an operator can select one of the three fields of selection menu 6. Depending on the activation of the means of input, symbol 4 can then be changed. For example, it is possible that symbol 4 can be represented on display panel 1 in reduced size after a reducing mode has been selected. It is also possible that symbol 4 can be reduced in terms of the informational content displayed, in that the text display is erased from display panel 1. A third variation is shown in FIG. 1b, i.e., a selection of conversion to a counter which will be explained in greater detail below with respect to FIG. 1b.

Figure 1B:
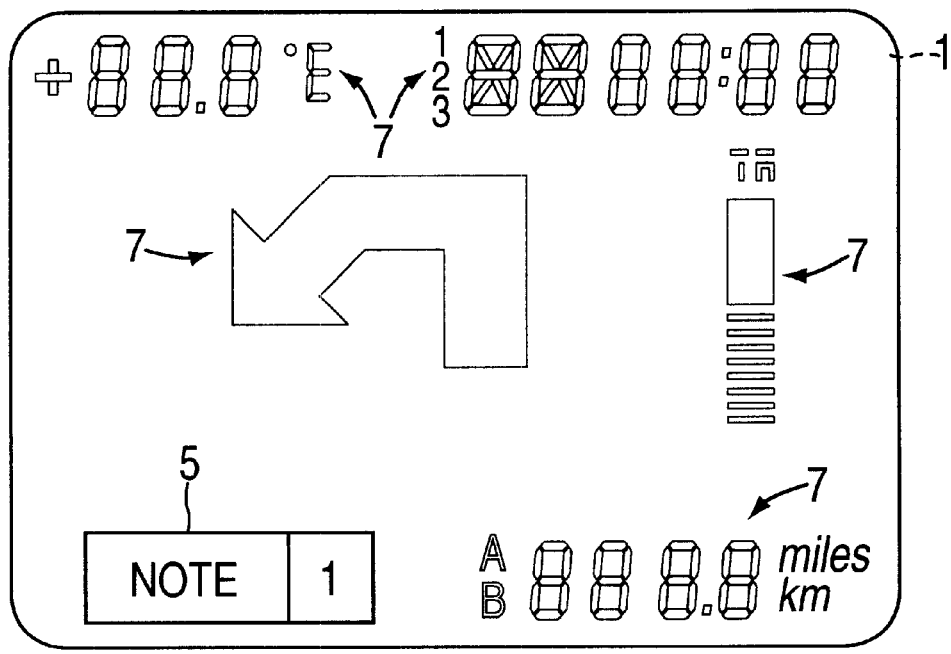
FIG. 1b shows a display panel with a different symbol.

FIG. 1b shows a different symbol 5 on display panel 1, as well as several sets of information with low display priority 7. By selecting field c with the counter function from selection menu 6 shown in FIG. 1a, symbol 4 was erased from display panel 1 and replaced by different symbol 5. Different symbol 5 is structured in the form of a counter which includes a text section and a numerical section; the counter reading is incremented every time symbol 4 is erased from display panel 1 by selecting field c of selection menu 6. Because symbol 4 was erased from display panel 1 and replaced by different symbol 5, the remaining area of display panel 1 is available for sets of information with lower display priority 7. Examples of such sets of information with lower display priority 7 shown in FIG. 1b are displays of digital counters for distance traveled, time of day, etc., as well as a bar display and a direction indicator.

The sequence of the process for displaying several sets of information with different display priority will be explained below with respect to a flow chart shown in FIG. 2.

The process begins with the display of several sets of information using a selection list (AL) and a size list (GL). This is indicated with field 10, which marks the start of the process. The selection list (AL) contains a sequence of all sets of information to be displayed ranked by their priority, i.e. their importance for the operator. Based on the limited size of display panel 1, it is usual not to display all the sets of information that can be displayed, but rather only those sets of information which exceed a certain minimum priority. The size list (GL), on the other hand, contains information about the size in which the sets of information are to be displayed on display panel 1 in each instance. The process then arrives at a query 11 in which it is determined to whether high-priority information 3 is present (HPI?). Recognition of the presence of such information can take place, for example, using a sequential query of sensors which measure certain conditions and transmit appropriate high-priority information 3 to a control device, or the like, which performs the process, if a certain condition occurs. If such high-priority information 3 is present, this information is entered 12 in the selection list and the size list. In this context, this high-priority information 3 is first assigned a large size, so that the operator can clearly recognize the information and is sufficiently informed. For this purpose, the sizes of the other sets of information to be displayed, with lower display priority 7, are reduced in the size list at the same time. This is done so that the other sets of information with lower display priority 7 are still displayed, but the importance of newly displayed high-priority information 3 is taken into account and this information is emphasized in terms of size, as compared with the other sets of information with lower display priority 7. After this change in the selection list and the size list, another display 13 of all the sets of information to be displayed is output, as a function of the selection list and the size list.

Subsequently, the operator is given the opportunity, for example using a selection menu similar to one shown in FIG. 1a, to activate 18 the counter by activating an input element. During a subsequent query 19, it is determined whether the corresponding means of input (e.g., a corresponding input system) for activating the counter was activated. If activation of the counter was desired, in following step 20, high-priority information 3 is deleted from the selection list and written into a counter list CL (AL→HPI→CL). In addition, in a next step 21, a counter variable Z is incremented and the counter itself is entered in the selection list (Z:=Z+1, Z→AL). Thereafter the process branches back to starting point 10, i.e. the sets of information are displayed as a function of the selection list and the size list.

If, during query 11 to determine whether high-priority information 3 has occurred (HPI?), no such information was found, the process sequence branches off to another query 14 to determine whether there is at least one set of high-priority information 3 in the selection list (HPI∈AL?), i.e. whether any high-priority information 3 is being displayed at the present time. If this is the case, the process branches back to offer 18 of the possibility of activating the counter. If, on the other hand, no high-priority information 3 is in the selection list, no high-priority information 3 will be displayed, and therefore no related counter has to be offered. Therefore the sequence branches back to its beginning 10 in this case.

If, in response to query 19 to determine whether a counter is to be displayed, the operator entered that no counter is desired, the operator is offered an option, in next step 15, to change the size of the display of high-priority information 3 by activating a means of input (e.g., another input system) (G↑↓). During subsequent query 16, it is determined whether such a size change was selected by the operator (G↑↓?). If the size was changed by the operator, the size input is entered in the size list during a subsequent step 17 (G→GL), and, at the same time, the remaining sizes of the sets of information with lower display priority 7, which are supposed to continue to be displayed, are changed inversely. As a size change which can be offered in the selection menu, the operator can choose to display high-priority information 3 in an unchanged display form again, or with a maximum or minimum size and/or informational content. However, an infinitely adjustable or incremental change can also be offered as a selection.

Thereafter, just as in the case if no size change was input, a query is made whether the counter is activated (i.e., query 22). If the counter is switched off, the program returns to start 10 of the process sequence. If, on the other hand, the counter is activated, the operator is given an option, in step 23, of again displaying the sets of high-priority information 3, which were replaced by the counter and otherwise no longer displayed, in their unchanged form, i.e. in the form in which they were present the first time that high-priority information 3 was displayed. After subsequent query 24 to determine whether such a display was selected, the corresponding high-priority information is deleted from the counter list in a process step 25, if the query was answered in the affirmative, and written into the selection list (CL→HPI→AL). Additionally, decrementation 26 of the counter reading takes place (Z:=Z−1). After decrementation 26 of the counter reading, a query 27 takes place whether the counter reading has dropped to zero (Z=0?). If the counter reading is equal to zero, the counter is deleted from the selection list during a subsequent process step 28 (AL→Z). However, if the counter reading is not yet equal to zero, the counter remains in the selection list. Subsequently, the process returns to its beginning 10. This is also the case if no display of high-priority information 3 which was no longer being displayed was selected, or also if no counter was activated.

Figure 2:
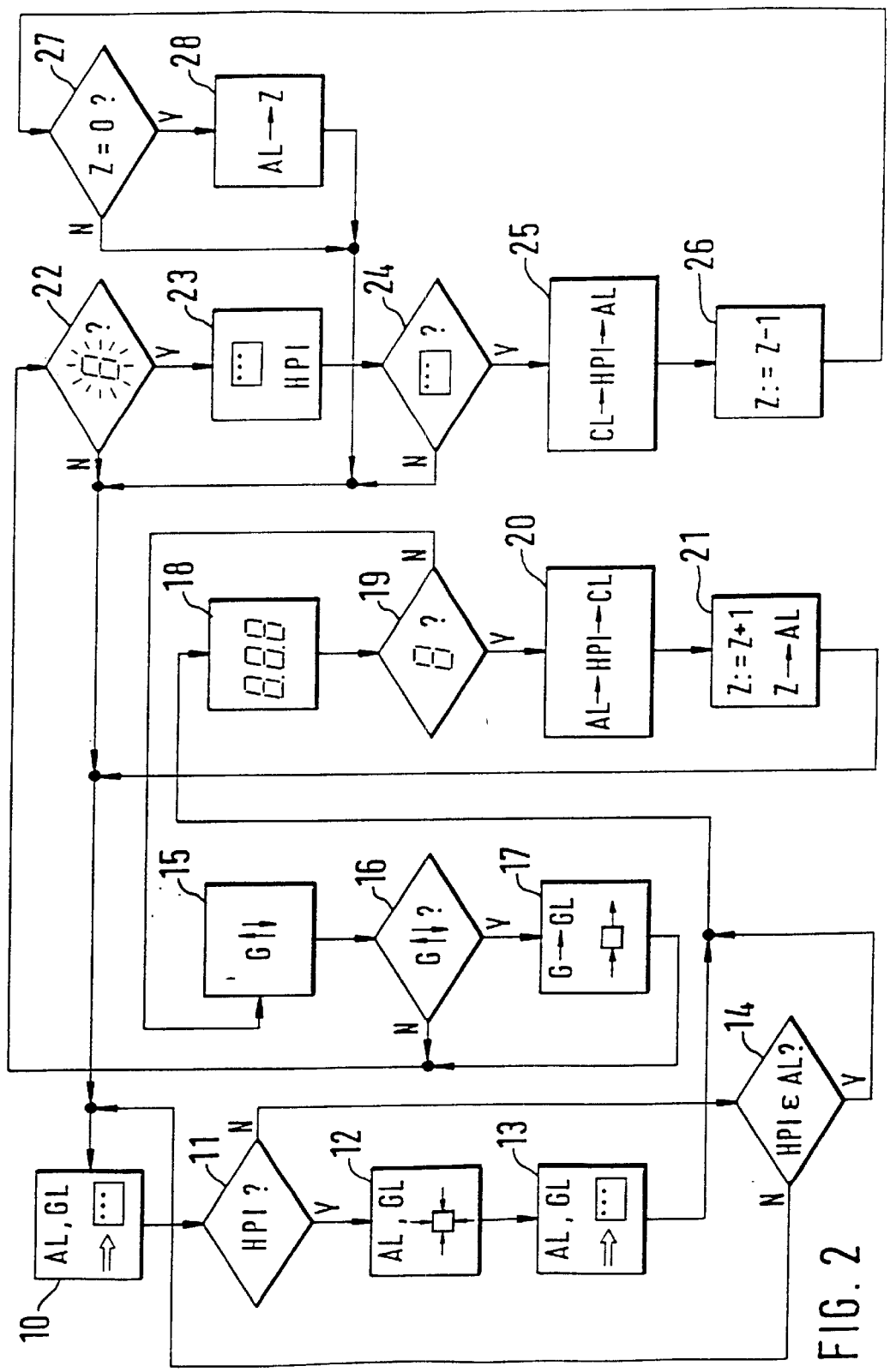
FIG. 2 shows a flow chart for a display process according to the present invention.

The query whether a condition which triggered high-priority information 3 has already been eliminated is not shown in FIG. 2. This can be done most easily with high-priority information 3 being is declared to be no longer present by a sensor which reported the condition, in response to related query 11 (HPI?). Then, high-priority information 3 which was displayed in connection with the condition which has been eliminated in the meantime will also be deleted as the flow chart progresses.

With this process, according to the present invention it is therefore possible to display high-priority information 3 on display panel 1 until the condition on which display of high-priority information 3 was based has been eliminated. However, until such time the operator has an option of selecting the type of display of high-priority information 3, which is permanently displayed on display panel 1, by activating means of input, for example in the form of keys.

It is particularly possible to first display such information, when such condition occurs, with a large symbol and text information, and then to display the information in the form of a smaller symbol, particularly at the edge of display panel 1, after the operator has activated the means of input (i.e., the input system). This allows high-priority information 3 to be constantly displayed on display panel 1, on the one hand, while it is nevertheless possible to display other sets of information with lower display priority 7 on display panel 1. This is particularly advantageous if an immediate elimination of the condition which results in the display of high-priority information 3 that is not possible or not desirable. Activation of the means of input can also serve to determine whether the operator has read the information on display panel 1. If activation of the means of input to confirm displayed high-priority information 3 is stored in memory, for example, it is possible to determine at a later time, when the memory is read, what information the operator read and when, and what information was not read. Changes which can be selected by the operator could also be text changes, for example. Also, several counters can be used as different symbols 5, separately counting the sets of information which are no longer being displayed, according to specific priorities, groups of sets of information or other criteria.

The process according to the present invention can be used, e.g., for display instruments in vehicles. If the information is stored in memory, such as a vehicle data accident recorder, it is therefore also possible to determine warranty claims or liability limits on the basis of the data in memory. It is usually desirable for high-priority information 3 to be displayed immediately if a condition triggering such information has occurred in the vehicle in question. Such conditions can mean failures of major components or that vehicle-specific parameter limits have been exceeded or fallen short thereof. However, displays can also be time-controlled.

Furthermore, it can also be provided that an automatic reduction in size of high-priority information 3 takes place after a certain time span has elapsed, in order to offer the driver an overview of several sets of information at the same time again. Also, high-priority information 3 can be displayed, periodically alternating with other sets of information, until the operator inputs a change.

It is not necessary for high-priority information 3 to be displayed until the specific condition has been eliminated. It can also be useful to delete some sets of information from the display entirely, after a selection by the operator to this effect. During the first display of high-priority information 3, it is also advantageous to utilize the entire display area and therefore no longer to display the other sets of information previously displayed. Nevertheless, these sets of information, which are covered by high-priority information 3, can be made visible again by means of a changed selection by the operator.

What is claimed is:

1. A process for displaying a plurality of sets of information on a display panel, each of the plurality of sets of information having a different display priority, the process comprising the steps of:

displaying a symbol for high-priority information on the display panel, the symbol being displayed when a predetermined condition occurs; and while the symbol is displayed during a presence of the predetermined condition, reducing a size of the symbol as a function of at least one activation by an operator of at least one input system, the reduced symbol continuing to be displayed as long as the predetermined condition exists.

2. The process according to claim 1, wherein the symbol is displayed until the predetermined condition is no longer present.

3. The process according to claim 1, further comprising the step of:

changing a form of the symbol as a function of the at least one activation of the at least one input system.

4. The process according to claim 1, wherein, when the predetermined condition occurs, the displayed symbol has at least one of a symbol size and a status description displayed as alphanumeric characters, and wherein, to adapt the symbol to the predetermined condition, the symbol is reduced in at least one of size and form when the operator makes a predetermined selection.

5. The process according to claim 1, further comprising the step of:

replacing the symbol by at least one different symbol as a function of the at least one activation if at least two sets of the plurality of sets of information include the high-priority information, the at least one different symbol corresponding to a number of existing sets of the plurality of sets of information having the high-priority information.

6. The process according to claim 1, wherein:

the symbol includes an amount of information for display to the operator, and the step of reducing the size of the symbol includes the step of modifying the amount information in the symbol.

7. The process according to claim 1, further comprising the step of:

storing an indication that an input arrangement has been operated in acknowledgment of a display of an item of information.

8. The process according to claim 1, wherein:

the step of displaying the symbol and the step of reducing the size of the symbol are performed in a vehicle while the vehicle is being driven.

9. A process for displaying a plurality of sets of information on a display panel, each of the plurality of sets of information having a different display priority, the process comprising the steps of:

displaying a symbol for high-priority information on the display panel, the symbol being displayed when a predetermined condition occurs;

while the symbol is displayed during a presence of the predetermined condition, modifying the symbol as a function of at least one activation of at least one input system, the symbol being modified by an operator, wherein the symbol contains an amount of information for display to the operator, and wherein the step of modifying the symbol includes the step of modifying the amount of information in the symbol;

counting in a counter each item of high-priority information no longer displayed; and displaying the counter.

10. The process according to claim 9, wherein the symbol includes alphanumeric characters having a character text, the character text changing as a function of the at least one activation.

11. The process according to claim 9, further comprising the step of:

further displaying the symbol in an unchanged form as a function of at least one additional activation of the at least one input system by the operator.

12. The process according to claim 9, further comprising the step of:

after displaying the symbol, changing visual forms of additional sets of the plurality of sets of information having a lower priority information.

13. The process according to claim 9, wherein the step of modifying the symbol includes the step of:

providing an option to the operator to modify the symbol using a predetermined selection menu displayed on the display panel.

14. The process according to claim 9, further comprising the step of:

changing display characteristics of additional sets of the plurality of sets of information on the display panel when the predetermined condition occurs, the additional sets having lower priority information.

15. The process according to claim 14, wherein the step of changing the display characteristics includes the step of:

at least one of reducing a size of additional symbols corresponding to the additional sets and temporarily preventing the additional sets from being displayed.

16. The process according to claim 9, wherein the high-priority information includes a warning signal.

17. A process for displaying a plurality of sets of information on a display panel, each of the plurality of sets of information having a different display priority, the process comprising the steps of:

displaying a symbol for high-priority information on the display panel, the symbol being displayed when a predetermined condition occurs;

while the symbol is displayed during a presence of the predetermined condition, modifying the symbol as a function of at least one activation of at least one input system, the symbol being modified by an operator;

counting in a counter each item of high-priority information no longer displayed; and displaying the counter.

18. A process for displaying a plurality of sets of information on a display panel, each of the plurality of sets of information having a different display priority, the process comprising the steps of:

displaying a symbol for high-priority information on the display panel, the symbol being displayed when a predetermined condition occurs; and while the symbol is displayed during a presence of the predetermined condition, modifying at least an information content of the symbol as a function of at least one activation of at least one input system without switching to a display of another symbol, the symbol being modified by an operator.

* * * * *